(12) United States Patent
Stickley et al.

(10) Patent No.: US 7,768,442 B2
(45) Date of Patent: Aug. 3, 2010

(54) INTERFEROMETRIC SIGNAL PROCESSING

(75) Inventors: Glen Stickley, Brisbane (AU); Bryan Reeves, Brisbane (AU)

(73) Assignee: Groundprobe Pty. Ltd., Queensland (AU)

( * ) Notice: Subject to any disclaimer, the term of this patent is extended or adjusted under 35 U.S.C. 154(b) by 222 days.

(21) Appl. No.: 11/988,821

(22) PCT Filed: Jul. 18, 2006

(86) PCT No.: PCT/AU2006/001013
§ 371 (c)(1),
(2), (4) Date: Jan. 15, 2008

(87) PCT Pub. No.: WO2007/009175
PCT Pub. Date: Jan. 25, 2007

(65) Prior Publication Data
US 2009/0121921 A1    May 14, 2009

(30) Foreign Application Priority Data
Jul. 18, 2005    (AU)    ............................... 2005903785

(51) Int. Cl.
*G01S 13/62* (2006.01)
*G01S 13/89* (2006.01)

(52) U.S. Cl. .................. 342/28; 342/179; 342/114; 342/156

(58) Field of Classification Search .................. 342/28, 342/114, 156, 160, 179, 197
See application file for complete search history.

(56) References Cited

U.S. PATENT DOCUMENTS

| | | | |
|---|---|---|---|
| 4,101,891 A * | 7/1978 | Fletcher et al. ........... | 342/25 A |
| 4,518,854 A | 5/1985 | Hutchin | |
| 5,208,600 A * | 5/1993 | Rubin ....................... | 342/26 D |
| 6,400,306 B1* | 6/2002 | Nohara et al. ............. | 342/25 R |
| 6,583,751 B1* | 6/2003 | Ferretti et al. ............. | 342/25 R |
| 6,633,254 B1* | 10/2003 | Sutphin ..................... | 342/28 |
| 6,784,826 B2* | 8/2004 | Kane et al. .................... | 342/28 |

(Continued)

FOREIGN PATENT DOCUMENTS

WO    0072045 A1    11/2000

(Continued)

OTHER PUBLICATIONS

"Simulation of abandoned mining induced surface movements for estimating DInSAR detection limits", Petrat, L.; Wegmuller, U. Geoscience and Remote Sensing Symposium, 2003. IGARSS '03. Proceedings. 2003 IEEE International, vol. 4, Jul. 21-25, 2003 pp. 2936-2938.*

(Continued)

*Primary Examiner*—John B Sotomayor
(74) *Attorney, Agent, or Firm*—Howard & Howard Attorneys PLLC

(57) ABSTRACT

A method of error handling in a slope monitoring system that generates slope movement data from interferometric signal processing of radar images of the slope monitoring system. The error handling occurs in two steps. The movement data is corrected for changes in atmospheric conditions and disturbances are identified. It is convenient to mask the regions identified as disturbed in the display of the corrected movement data. Typical disturbances include short term disturbances, such as trucks, and long term disturbances, such as vegetation.

17 Claims, 9 Drawing Sheets

U.S. PATENT DOCUMENTS

| | | | |
|---|---|---|---|
| 6,850,183 B2* | 2/2005 | Reeves et al. | 342/22 |
| 7,154,434 B1* | 12/2006 | Sego | 342/161 |
| 7,656,341 B2* | 2/2010 | Reeves | 342/22 |
| 2004/0046690 A1* | 3/2004 | Reeves et al. | 342/175 |
| 2004/0267454 A1 | 12/2004 | Granjeon | |
| 2009/0033556 A1* | 2/2009 | Stickley et al. | 342/374 |
| 2009/0121888 A1* | 5/2009 | Reeves et al. | 340/669 |
| 2009/0121921 A1* | 5/2009 | Stickley et al. | 342/179 |
| 2009/0160700 A1* | 6/2009 | Messer-Yaron et al. | 342/26 R |
| 2009/0262006 A1* | 10/2009 | McNeill et al. | 342/22 |

FOREIGN PATENT DOCUMENTS

| | | | |
|---|---|---|---|
| WO | 0246790 A1 | 6/2002 | |
| WO | WO 2007009175 A1 * | 1/2007 | |
| WO | WO 2007012112 A1 * | 2/2007 | |
| WO | WO 2007045026 A1 * | 4/2007 | |

OTHER PUBLICATIONS

"Use of InSAR data for landslide monitoring: a case study from southern Italy", Refice, A.; Bovenga, F.; Wasowski, J.; Guerriero, L. Geoscience and Remote Sensing Symposium, 2000. Proceedings. IGARSS 2000. IEEE 2000 International, vol. 6, 2000 pp. 2504-2506.*

"On the derivation of coseismic displacement fields using differential radar interferometry: The Landers earthquake", Zebker, H.A.; Rosen, P., IGARSS '94. vol. 1, Aug. 8-12, 1994 pp. 286-288.*

Rosen et al. Synthetic Aperture Radar Interferometry. Proceedings of the IEEE, vol. 88, No. 3, pp. 333-382, Mar. 2000. See for example Section II. B., II. C., III. F., IV. A. and Appendix B.

McHugh et al. Applications of Ground-based radar to mine slope monitoring. Proceedings of the Annual Conference of American Society for Photogrammetry and Remote Sensing (ASPRS), May 23-28, 2004. See whole of document.

Reeves et al. Developments in monitoring mine slope stability using radar interferometry. Proceedings of the IEEE 2000 International Geoscience and Remote Sensing Symposium (IGARSS 2000), vol. 5, pp. 2325-2327, 2000. See whole of document.

Hernandez et al. A Comparison between short term (co-seismic) and long term (one year) slip for the Landers earthquake: Measurements from strong motion and SAR interferometry. Geophysical Research Letters, Col. 24, No. 13, pp. 1579-1582, Jul. 1, 1997.

International Search Report.

Noferini et al. Permanent Scatterers Analysis for Atmospheric Correction in Ground-Based SAR Interferometry. IEEE Transactions on Geoscience and Remote Sensing, vol. 43, No. 7, Jul. 2005.

Barbieri et al. Space-Borne and Ground-Based SAR Interferometry for Landslide Activity Analysis and Monitoring in the Appennines of Emilia Romagna (Italy): Review of Methods and Preliminary Results. Proceedings of 2003 Fringe Workshop, Frascati, Italy, Dec. 5, 2003.

Luzi et al. Ground-Based Radar Interferometry for Landslides Monitoring: Atmospheric and Instrumental Decorrelation Sources on Experimental Data. IEEE Transactions on Geoscience and Remote Sensing, vol. 42, No. 11, Nov. 2004.

Tarchi et al. Landslide Monitoring by Using Ground-Based SAR Interferometry: An Example of Application to the Tessina Landslide in Italy. Engineering Geology 69 (2003) 15-30.

Lee et al. Analysis of Topographic Decorrelation in SAR Interferometry Using Ratio Coherence Imagery. IEEE Transactions on Geoscience and Remote Sensing, vol. 39, No. 2, Feb. 2001.

* cited by examiner

INTERFEROMETRIC SIGNAL PROCESSING

BACKGROUND TO THE INVENTION

The Slope Stability Radar (SSR) is a ground based interferometric radar, designed to detect the precursor movements to slope failure in open cut mines. It achieves this by remotely monitoring the movement of the rock face, and using these movements to predict slope failure. The monitored region is scanned regularly, producing a close to real time assessment of the rock face and allows mine staff to react quickly to changes in the rock face. To achieve maximum safety benefit high accuracy and reliable measurements are required.

A mine using the SSR is reliant upon the measurement data from the system for safety warnings. Any disturbance to the signal could, unless identified, be incorrectly interpreted as a wall movement. Haul trucks and other mining vehicles can block the path between the SSR and target section of wall. Mine plant equipment, such as pumps and lighting plants may be parked in regions of the image. Grass and other vegetation may also be growing on the face in the field of view of the radar. Even the air itself between the SSR and the wall can appear to induce movements when there is a change in atmospheric pressure, humidity or temperature. This affects the refractive index of the air and thus the speed of the radar wave through the medium.

All these effects reduce the precision of the measurements. The regional disturbances of the haul trucks often disguise the true movements in those areas. Vegetation causes random fluctuations in the signal, which could be interpreted as movement. If the reduced measurement precision of some areas is left unidentified, the user's confidence for other more stable areas on the wall will be reduced. Finally atmospheric changes appear to produce global movements of the whole wall which, if left uncompensated, would appear as fluctuating movements of the wall, and not allow the true movements to be detected. An even worse phenomenon for atmospherics is that they can also produce a permanent change to the measured displacement due to signal ambiguity issues resulting from the measurement method. The result of these effects can be a lack of trust by the user in the measurements made by the SSR. To regain the trust of the user these effects need to be corrected or removed, or at least identified and displayed to the user.

To allow understanding and identification of these disturbances it is important to understand the method of operation of the SSR. This has been described previously in our granted U.S. Pat. No. 6,850,183. The SSR uses the phase of the returned signal to determine the movement of a wall slope. As explained in Reeves B. A. et al., "Developments in Monitoring Mine Slope Stability using Radar Interferometry"; IEEE Publication 0-7803-6359-0/00, pp. 2325-2327 and Bamler R. et al., "Synthetic aperture radar interferometry", Inverse Problems. Vol 14, pp 1-54 1998, phase change can be converted to displacement using the following formula:

$$\Delta d = \Delta \phi \lambda / 4\pi + n\lambda/2 \qquad [1]$$

where $\Delta d$ is the displacement, $\Delta \phi$ is the measured change in phase, $\lambda$ is the wavelength of the carrier frequency of the radar (32 mm) and n is an integer unknown.

The parameter "n" corresponds to the number of wavelength cycles the target has moved between scans. For small time intervals this is assumed to be 0. As the phase is a number between $+/-\pi$, the result is that for the measured distance change to be correct the actual distance change needs to be less than $+/-\lambda/4$ or $+/-8$ mm. As a result, processing methods need to be both robust for removal of disturbances to the phase change (and thus displacement) measurement, as well as being able to improve the accuracy of the estimation of the unknown "n" within the displacement calculation formula.

One of the processing techniques described in U.S. Pat. No. 6,850,183 to improve signal quality was atmospheric correction. In this technique, a single reference section of wall was used to determine the atmospheric effect on the signal. This calculated correction was then applied to the remainder of the wall. Simple processing based on changes in amplitude and phase for detection of vegetation and other spurious signals, such as trucks, was also discussed.

The problems with the known technique for disturbance rejection include:

- Large atmospheric changes in the environment may induce a wrapping error when the difference between subsequent measurements is greater than $+/-\lambda/4$ mm;
- As the range to a single atmospheric correction region increases the chance of getting a wrapping error increases, thus limiting the range of the system;
- A wall movement in the atmospheric correction region will produce a false apparent movement of the wall;
- A truck, vegetation or other type of disturbance in the atmospheric region will produce a false apparent movement of the wall;
- The single atmospheric region correction works best for targets at a similar range. If the targets of interest are distributed over a large band of ranges, the atmospheric correction does not work effectively;
- The known approaches do not compensate for temperature changes or other effects on the radar electronics;
- Disturbing signals from trucks and other mining vehicles can cause step changes in the displacement measurements, confusing the user and making automatic alarming difficult; and
- Vegetation on the rock face reduces the accuracy of the displacement measurements for that location, confusing the user and reducing confidence in the rest of the measurements.

Identifying and rejecting these disturbances will significantly improve the precision of the SSR, increase confidence in the measurement accuracy, and reduce the number of false positive alarms. This will in turn improve the acceptance of the SSR technology leading to improved mine safety.

DISCLOSURE OF THE INVENTION

In one form, although it need not be the only or indeed the broadest form, the invention resides in an anomaly detection and correction module for a slope monitoring system comprising:

an atmospheric correction module that corrects slope movement measurements for anomalies caused by atmospheric changes; and a disturbance detection module that identifies disturbances that cause errors in the slope movement measurements.

The disturbance detection module suitably masks regions affected by the errors.

In another form the invention resides in a method of error handling in interferometric signal processing for a slope monitoring system including the steps of:

extracting uncorrected movement data from interferometric radar measurements;

correcting the movement data for changes in atmospheric conditions;

identifying disturbances in the corrected movement data; and displaying the corrected movement data and regions affected by the disturbances.

Suitably the regions affected by the disturbances are masked.

Disturbances are suitably blocking disturbances caused by short-term blockage of the radar signal, for example by trucks and other equipment, and random disturbances caused by long-term interference, for example by vegetation.

Atmospheric correction is suitably achieved by estimating the change in the signal speed due to changes in the refractive index of the air and the offset induced at zero range.

Identifying disturbances in the movement data is suitably achieved by detecting variations in short-term and long-term signal coherence.

In a further form the invention resides in a method of atmospheric correction of movement data comprising multiple data points in a slope monitoring system including the steps of:

selecting a plurality of atmospheric correction regions at different ranges;

deducing displacement data within the selected regions;

determining a search space;

calculating a cost function for a grid of points within the search space;

using a minimisation algorithm to determine a correction slope and offset; and applying the correction slope and offset to the movement data.

Suitably the step of a using a minimisation algorithm includes calculating local minima within the search space and using the local minima to seed a multidimensional minimisation algorithm to find true minima.

In a yet further form the invention resides in a method of identifying disturbances of movement data comprising multiple data points in a slope monitoring system including the steps of:

determining short-term coherence for each data point;

averaging the short-term coherence to determine long-term coherence;

comparing the long-term coherence to a first threshold and masking the data point if the long-term coherence is less than the first threshold; and comparing a ratio of the short-term coherence to the long-term coherence with a second threshold and masking the data point if the ratio is less than the second threshold.

The method may further include the step of comparing signal amplitude of the data point with a sky threshold and classifying the data point as sky if the amplitude is less than the sky threshold.

DETAILED DESCRIPTION OF THE DRAWINGS

Figure 1:
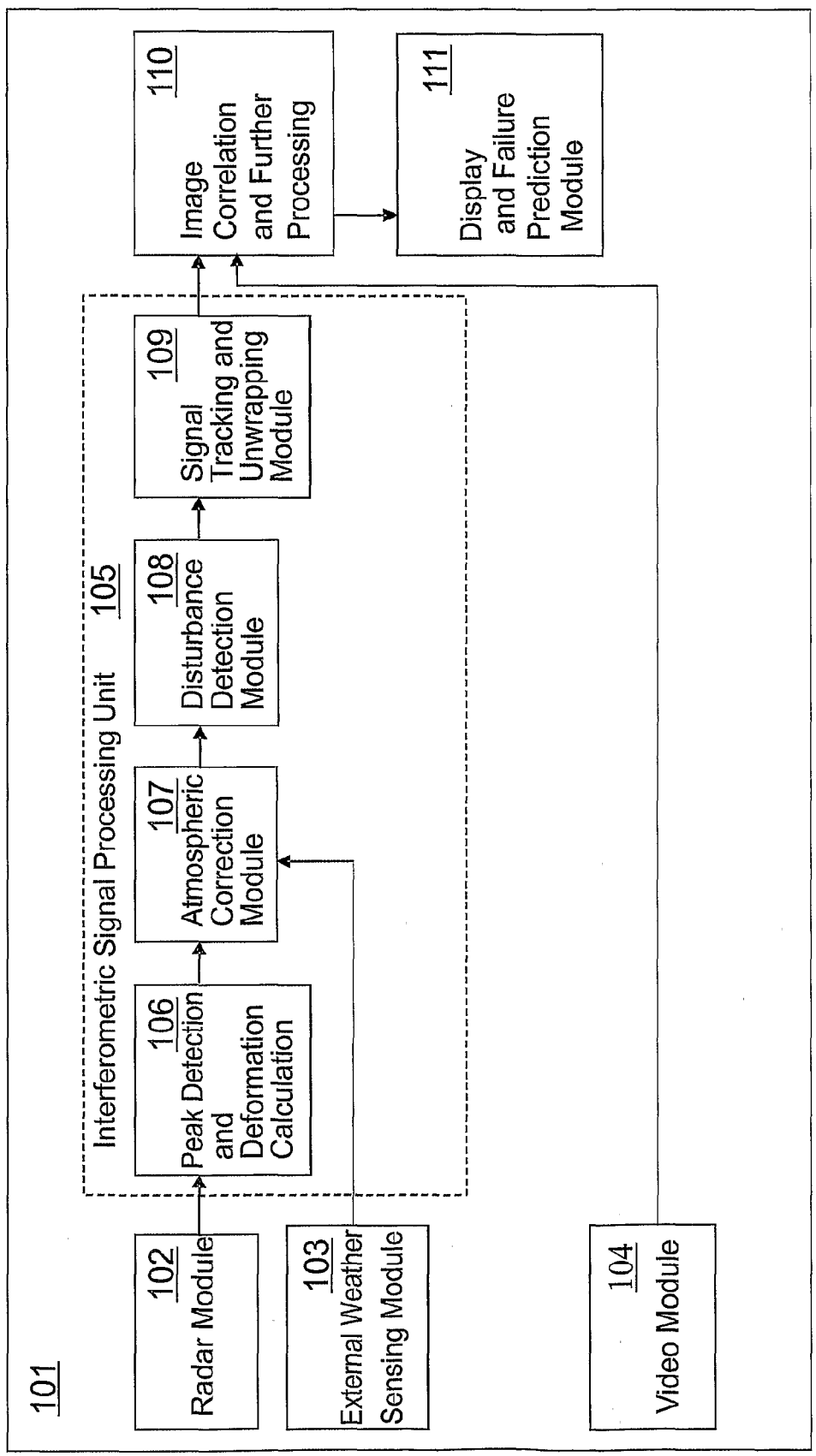
FIG. 1 shows a block schematic of the data processing steps within a Slope Stability Radar or similar monitoring system.

FIG. 1 displays the data flow for a SSR (slope stability radar) unit 101. Radar data from the radar module 102, in the form of a number of scans of the rock face, as well as video data from a video module 104 and atmospheric data from external weather sensing module 103 are fed into the system. The interferometric signal processing unit 105 consists of a number of modules, including peak detection and deformation calculation module 106, anomaly detection and correction module 112 which includes atmospheric correction module 107 and disturbance detection module 108, and signal tracking and unwrapping module 109. After the interferometric processing the data is combined with the video signal 110 for image correlation and further processing. Finally the resultant data is passed to the display and failure prediction module 111.

Signals from the radar module 102 are processed in the peak detection and deformation module 106 to convert them from radar range profile to phase and amplitude changes for the strongest signals for that footprint. From this the displacement data can be extracted. This data is then passed to the anomaly detection and correction module 112. The purpose of this module is to either eliminate, reduce or at least detect anomalies in the data caused by external effects on the system. These disturbances include changes in the atmosphere, mine vehicles such as trucks as well as vegetation on the wall face. Without this module significant false movement can appear in the deformation images produced by the SSR unit, leading to a false assumption that the wall is moving or the obscuration of actual wall movements. Both are failures of the system in the eyes of the user. Module 112 uses the displacement data and signal amplitudes to determine if the deformation is a true measure of the wall movement. It does this via two steps; firstly the effect of the atmosphere is identified and corrected in the atmospheric correction module 107. Without atmospheric correction, fluctuations of up to 30 mm can occur in the deformation images. Considering a typical system measurement accuracy is less than 1 mm, this error is completely unacceptable. Secondly, more localised disturbances are identified and eliminated from the image in the disturbance detection module 108. Without this trucks can temporarily disturb the signal, inducing jumps in the deformation data, which are difficult to identify in comparison to stepped wall movements. The result of module 112 is a clean signal, free from external disturbances allowing the user to see when true wall movements occur.

Figure 2:
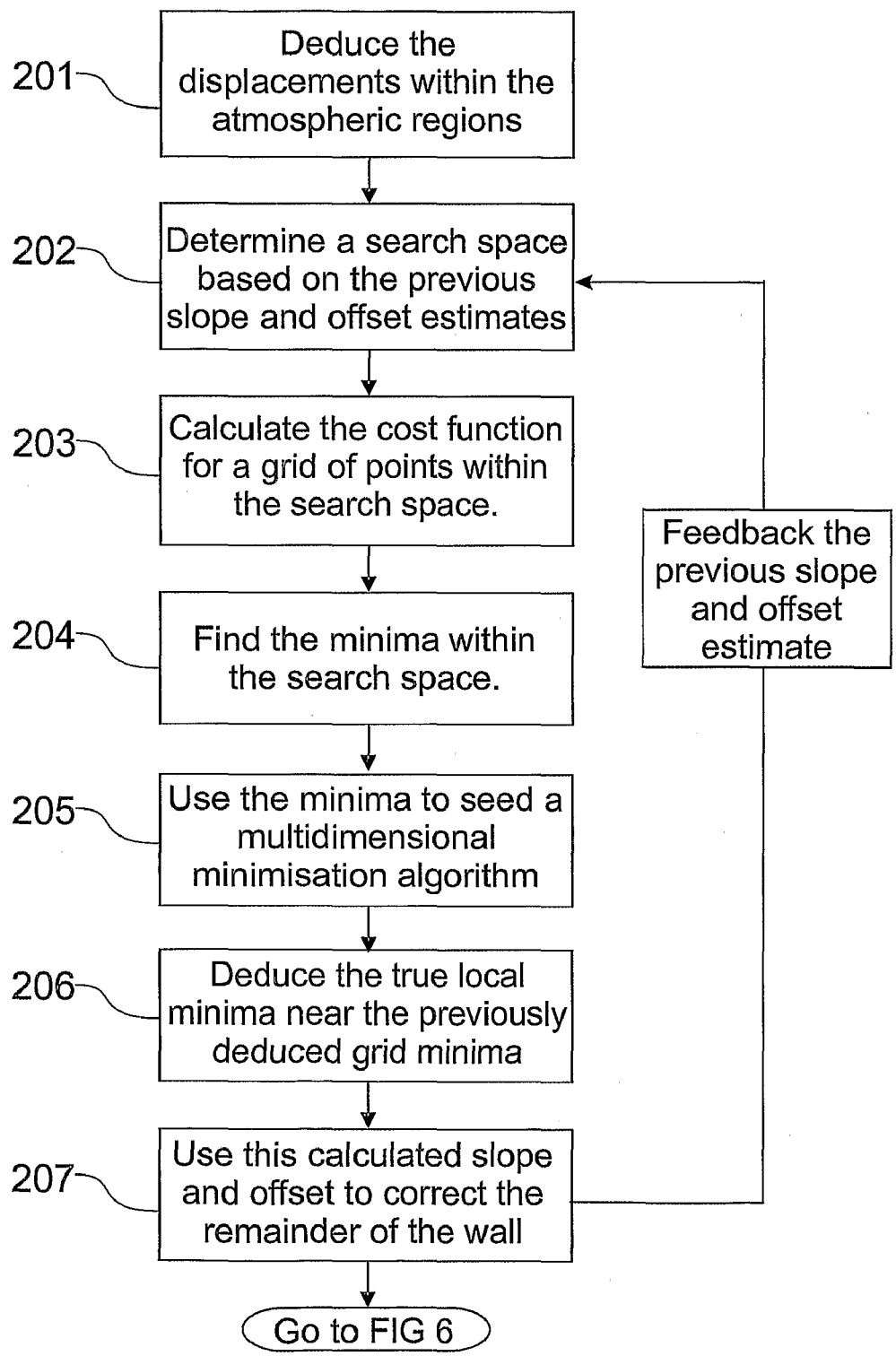
FIG. 2 is a flow diagram demonstrating the steps involved in determining the atmospheric correction to apply to radar measurements.

FIG. 2 shows a flow diagram for determining the atmospheric correction parameters and applying that correction to the radar measurements calculated by the Peak Detection and Deformation Calculation module 106. Atmospheric correction is suitably achieved by estimating two parameters, the ppm (parts per million) change in the signal speed due to changes in the refractive index of the air and the offset induced by the radar electronics or other effects at zero range.

The inventors have found that in many cases the effect of offset is less important so the offset can be constrained to zero. Another approach is to determine the offset separately, for example by measuring the radar reflection from the feed-horn, thereby eliminating influences other than the radar electronics.

Figure 3:
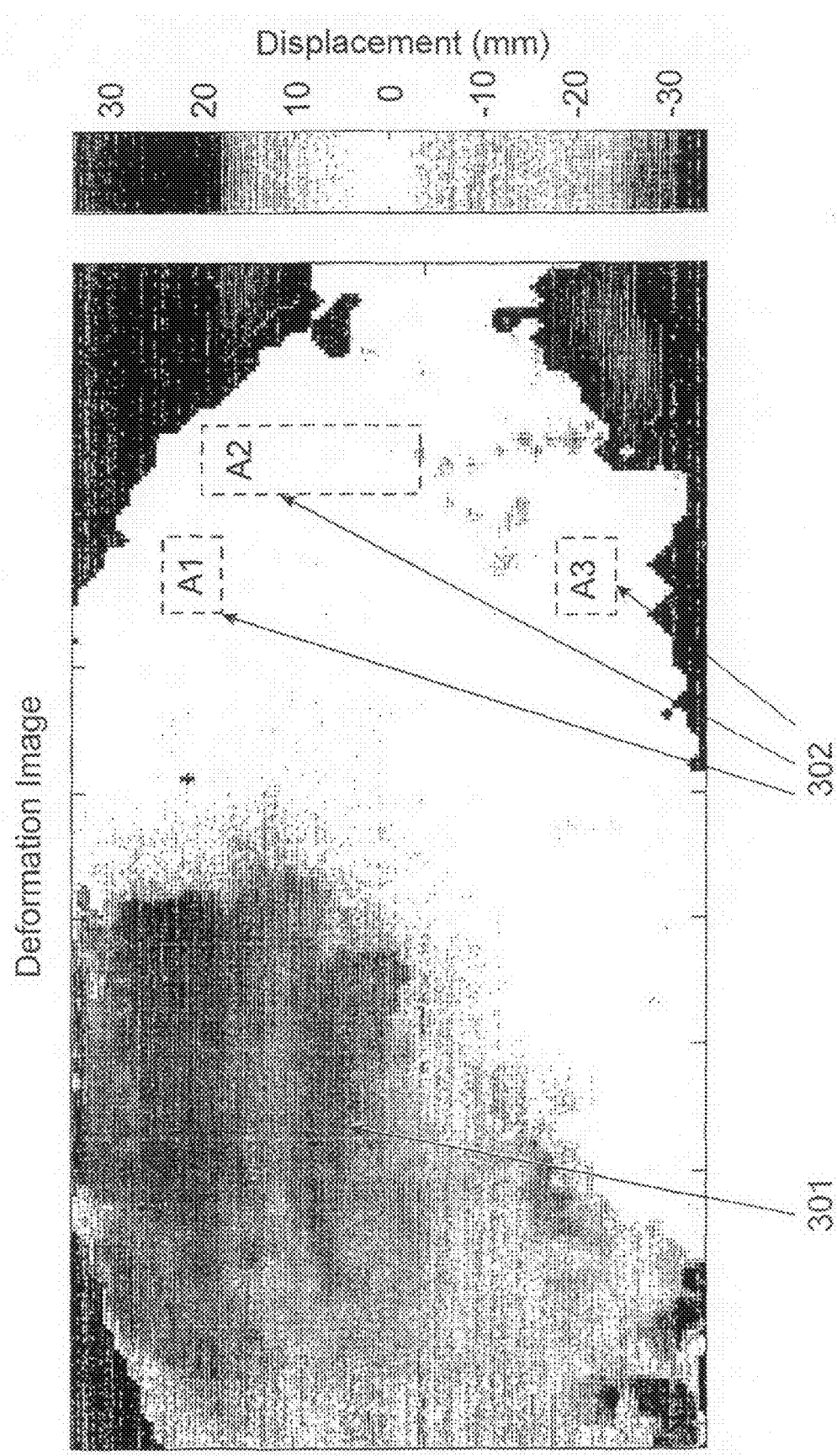
FIG. 3 shows an example of selecting a number of stable regions on the face to use for atmospheric correction.
Figure 4:
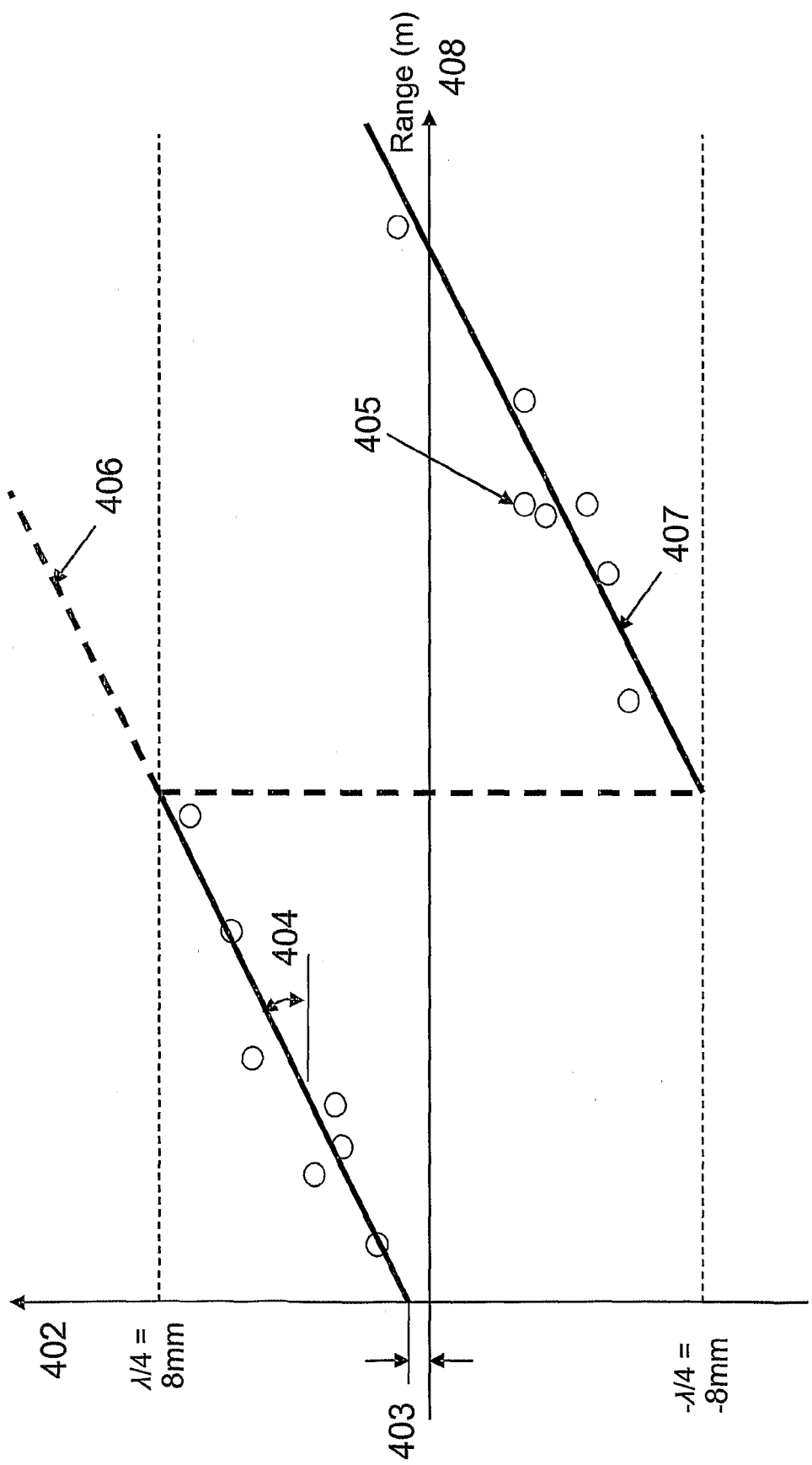
FIG. 4 shows the range dependence of the phase change with respect to the atmospheric correction required, in conjunction to the problems associated with ambiguity wrapping.

Firstly, the displacements within the selected atmospheric regions (see FIG. 3) are deduced 201, producing a plot similar to FIG. 4. A search space is then defined 202 based on the previous slope and offset (initially set to zero for each on start-up), which is then tessellated into a number of grid points. The weighted cost function is then evaluated 203 at each of these grid points, to determine a point close to the minima 204. These "grid" minima are then used to seed a multidimensional minimisation algorithm 205 to determine the exact minima 206. This calculated offset and slope is then used to correct the remainder of the displacement image 207.

FIG. 3 shows a typical selection of atmospheric regions to allow correction of atmospheric changes in the air between the radar and the wall. The display of FIG. 3 is a greyscale rendering of the usual colour display. The region 301 is a region of interest that is moving or is expected to move. A number of regions 302 (separate from the area moving or expected to move 301) are selected at various ranges A1, A3, or a single long region A2 could be used. The regions 302 should be within a stable region of the wall. These areas are often determined by the local geo-technical engineer via their understanding of the nature of the rock face. The goal of selecting a number of atmospheric regions is to obtain a measure of the atmospheric correction required from a number of points at different ranges.

The requirement to have an indication of the atmospheric region at a number of different ranges is to allow the slope and offset to be estimated at a number of ranges. This is because an estimate at close range will be less accurate than an estimate at a far range, but is also less likely to have the wrapping issue discussed below with reference to FIG. 4.

FIG. 4 displays a graphical representation of the estimation or wrapping problem. Points 405 are measured for various displacements within the atmospheric regions for a given interval of time. The points 405 are displayed on the graph with respect to the range 408 to the point. For points at close range, the points are unaffected by wrapping issues, however as the range to the atmospheric correction region increases a point is reached where the correction is greater than the system ambiguity (+/−λ/4 or 8 mm) 402. This is a consequence of the integer value "n" in equation 1. To estimate the slope 404 and offset 403, a line is fitted to the atmospheric correction points. To mirror the wrapping issues with the data points, the line 406 is also wrapped 407. FIG. 4 shows a number of points 405 fitted to the unwrapped line 406 and wrapping to the wrapped version of the line 407. Once the slope and offset is determined this is used to correct the remainder of the deformation image, where the slope corresponds to the ppm change in the speed of the electromagnetic signal from the radar and the offset corresponds to any phase drift in the radar electronics (normally induced by temperature changes).

Figure 5:
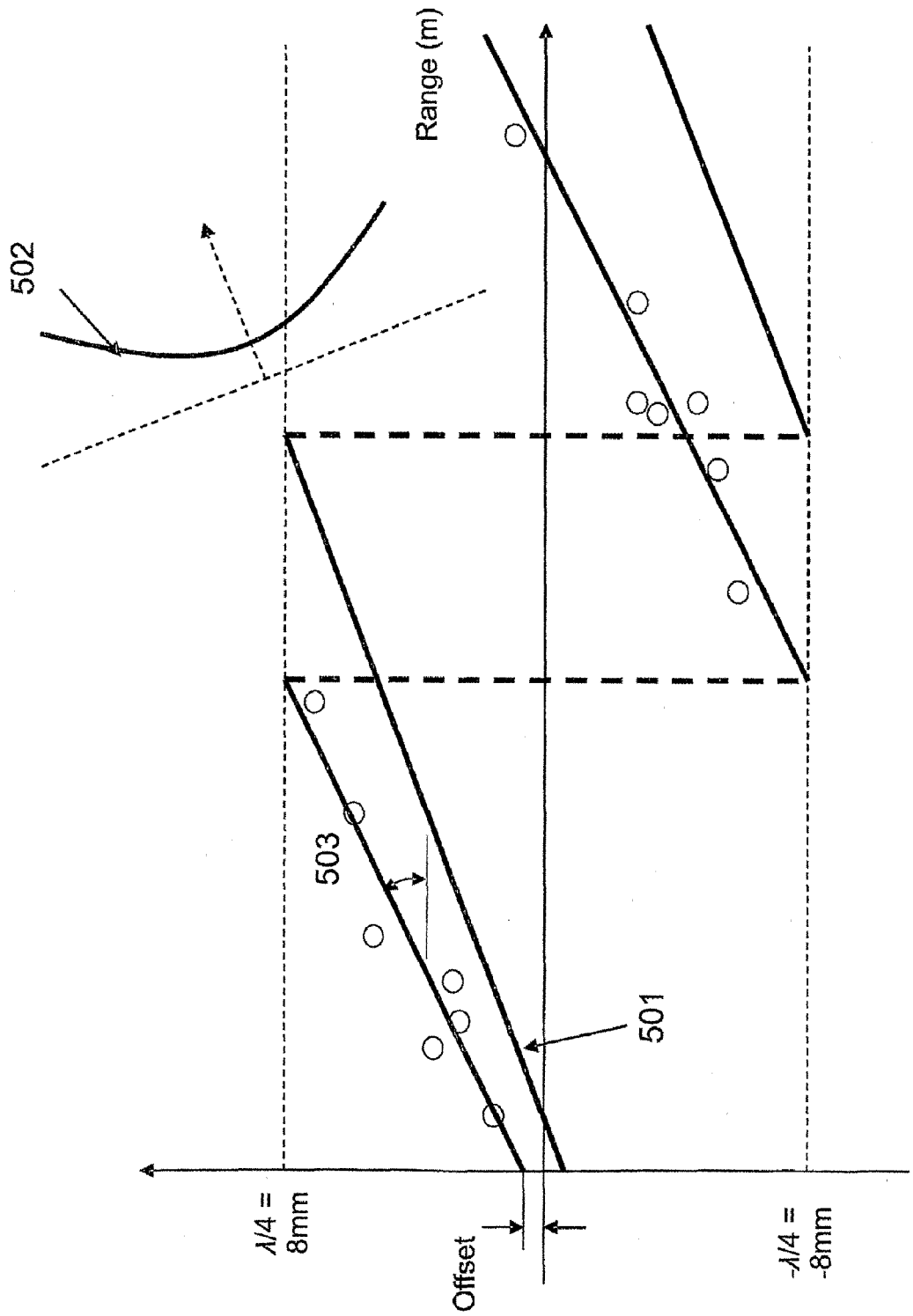
FIG. 5 shows the combined use of the wrapped line fit algorithm in combination with weighting of the cost function depending on the similarity to a previous line of best fit.

One process for estimating a line which best fits the given data points can be understood by reference to FIG. 5. A cost function is utilised which is equal to the root mean square estimate of the distance between the actual data points 503 and the wrapped version of the line. A minimisation algorithm is then used to test a number of different slopes and offsets to find the one that best fits the data points.

Another issue that must to be managed within the algorithm is to ensure that the slope and offset estimate stays within given limits. If there is no limit placed on the slope it is possible that the wrapping could increase to a point where there may be a solution where a highly wrapped line will fit through almost all of the points. This slope however is not a correct estimate of the ppm change due to atmospherics. To limit the offset and slope, an initial estimate 501 of the offset and slope is used. This can be determined via the previous offset and slope, or could be calculated from atmospheric measurements from external weather sensing module 103. This estimate is firstly used to limit the search space. Secondly, it is used to calculate a cost function weighting 502. Atmospheric measurements can also be used to correct long term errors due to movement of the atmospheric region.

As well as changes in the atmosphere between the radar and the target, other external disturbances can occur. These can be classified into two types, blocking disturbances and random disturbances. Objects that block the radar beam for a short period of time cause blocking anomalies. In the mining context, these include haul trucks, other mining vehicles and mine personnel. Objects that induce a continuous disturbance to the beam cause random disturbance. They include vegetation on the face such as grass and trees, as well as permanent vibrating equipment such as water pumps and lighting plants. A random disturbance is also a very rapidly moving wall, where the rock face is throwing rocks or material as it accelerates to failure.

A measure which is key to the identification and separation of these different anomalies is the interferometric coherence (or complex correlation coefficient). This is defined by Bamler (referenced above) as:

$$\gamma = E[u_1 u_2^*]/\sqrt{(E[|u_1|^2]E[|u_2|^2])} \qquad [2]$$

where E is the expected value, $u_1$ is the complex radar signal at time 1, $u_2$ is the complex radar signal at time 2 and $\gamma$ is the resultant interferometric coherence. The interferometric coherence is between 0 and 1 where 1 is high coherence and 0 is low coherence.

This is calculated for a zone around the signal peak for each returned echo from the wall. Identification of regions that contain blocking disturbances and random disturbances allows these regions to be highlighted as unreliable and disregarded for alarm purposes. As will be evident by reference to FIG. 9, it is also important to identify the sky and to apply a mask to ignore the sky.

Figure 6:
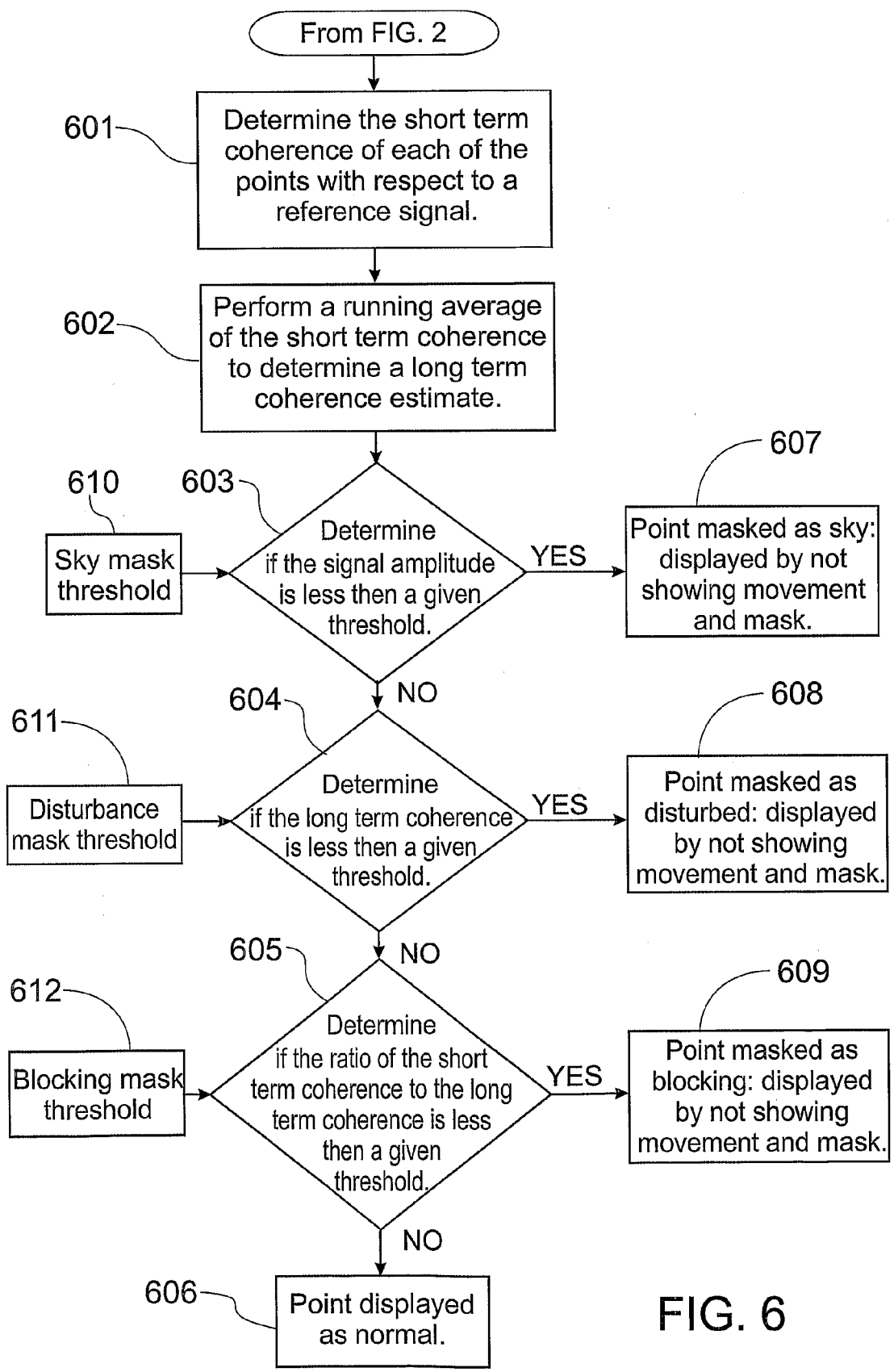
FIG. 6 shows a flow diagram demonstrating the techniques for removing the blocking effect of trucks and identifying the disturbance from vegetation from the actual movement of the wall.

FIG. 6 shows a flow diagram for classification of sky, blocking disturbances (trucks) and random disturbances (vegetation). The process follows from the atmospheric correction described by FIG. 2. Initially the short-term 601 and long-term 602 signal coherence is determined for each point on the wall. This is then fed into a decision matrix 603. If the signal is of low amplitude in comparison to the user defined sky mask threshold 610, it is classified as sky 607. Next the long-term coherence is compared 604 to a disturbance mask threshold 611. If the long-term coherence is less than this level, the point is masked as disturbed. Finally, the ratio of the short-term coherence to the long-term coherence is calculated and compared 605 to a given blocking mask threshold 612. If the calculated ratio is less then the blocking mask threshold the point is classified as a blocking mask 609. If the point passes all these tests, it is displayed in the usual manner 606.

It is convenient to use hysteresis in the threshold calculation for all of these decisions, ensuring a point close to the threshold point will not flicker between masked and not masked. This improves the user's confidence in the masking decision.

Figure 7A:
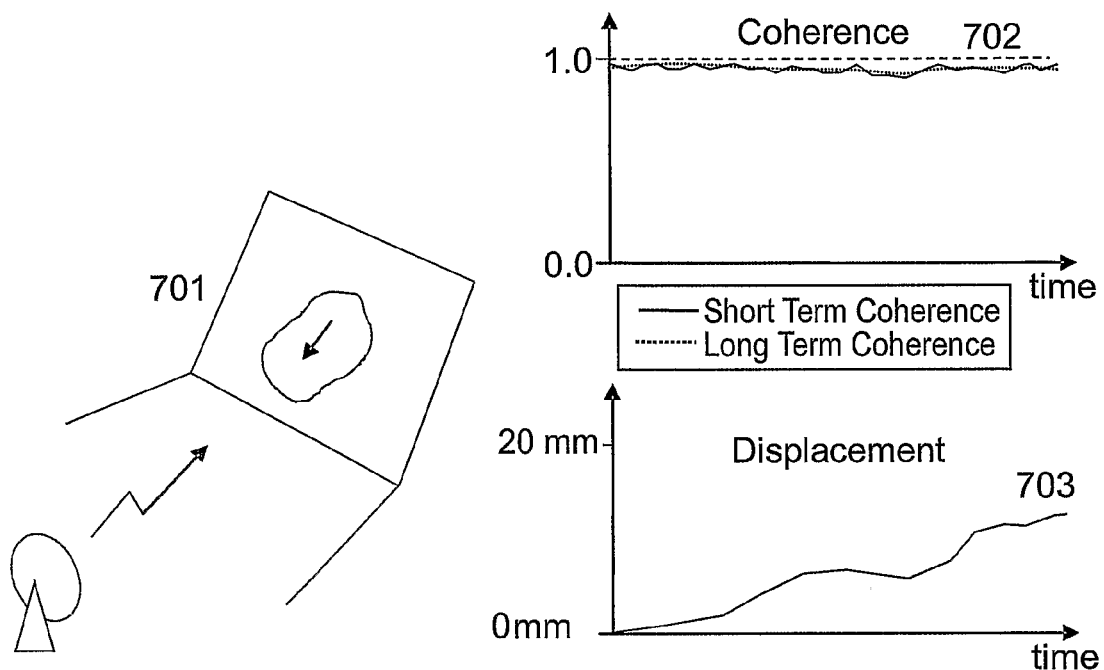
FIG. 7 shows typical normal signals when monitoring wall movements, ranging from small movements to rapid movements.
Figure 7B:
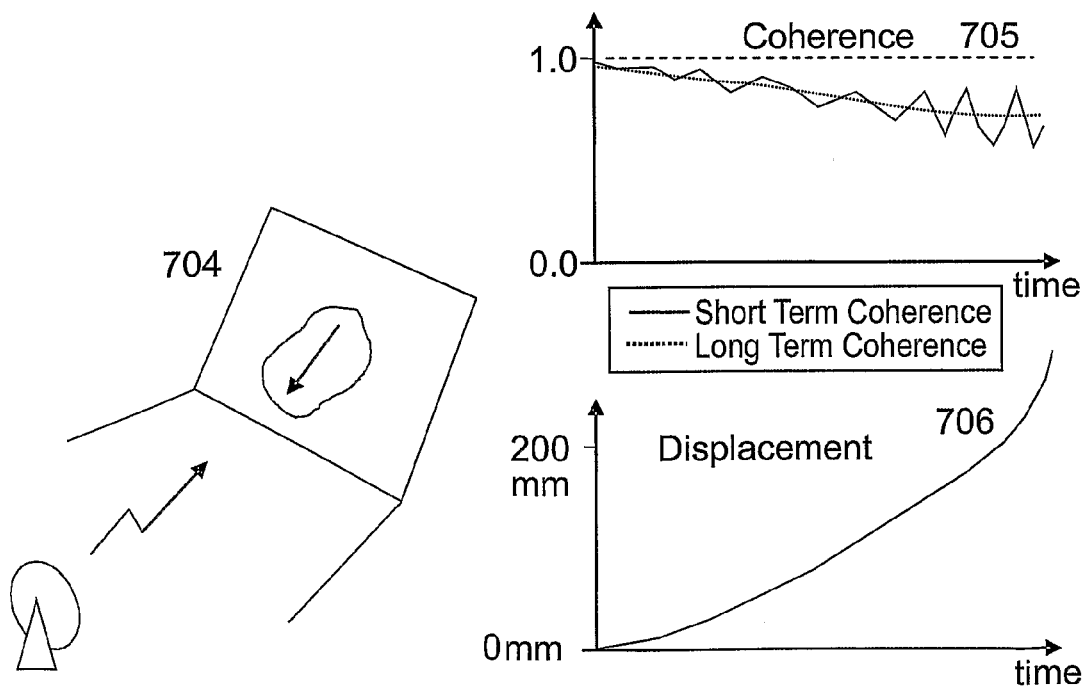
Figure 8A:
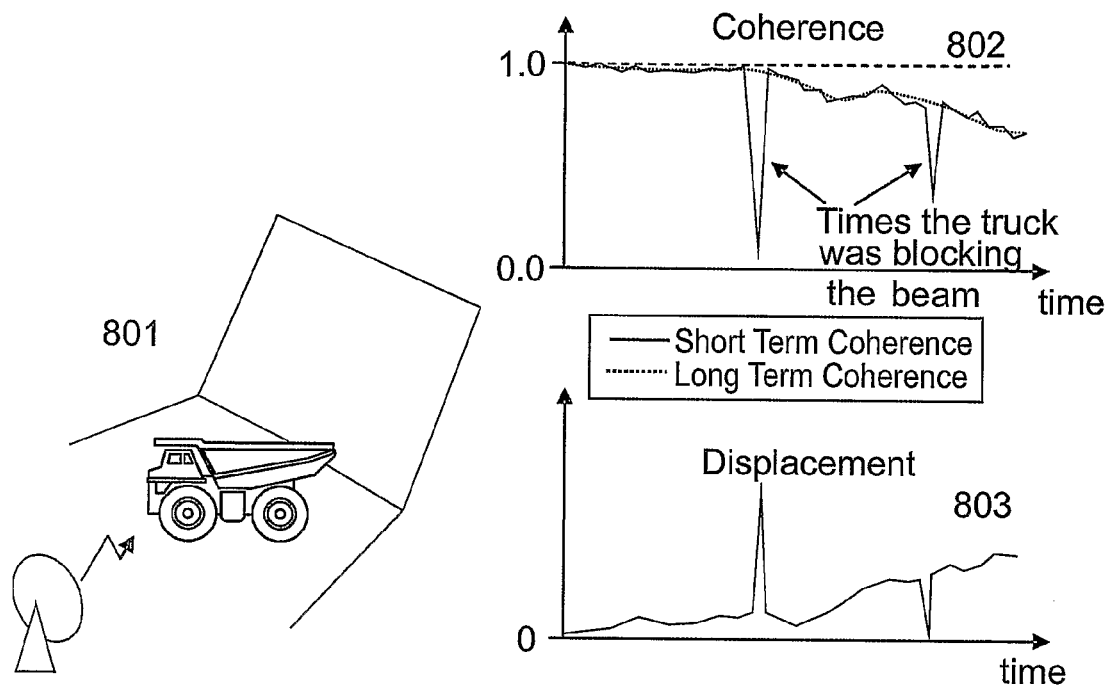
FIG. 8 shows typical signals due to blocking due to trucks and disturbance due to vegetation.
Figure 8B:
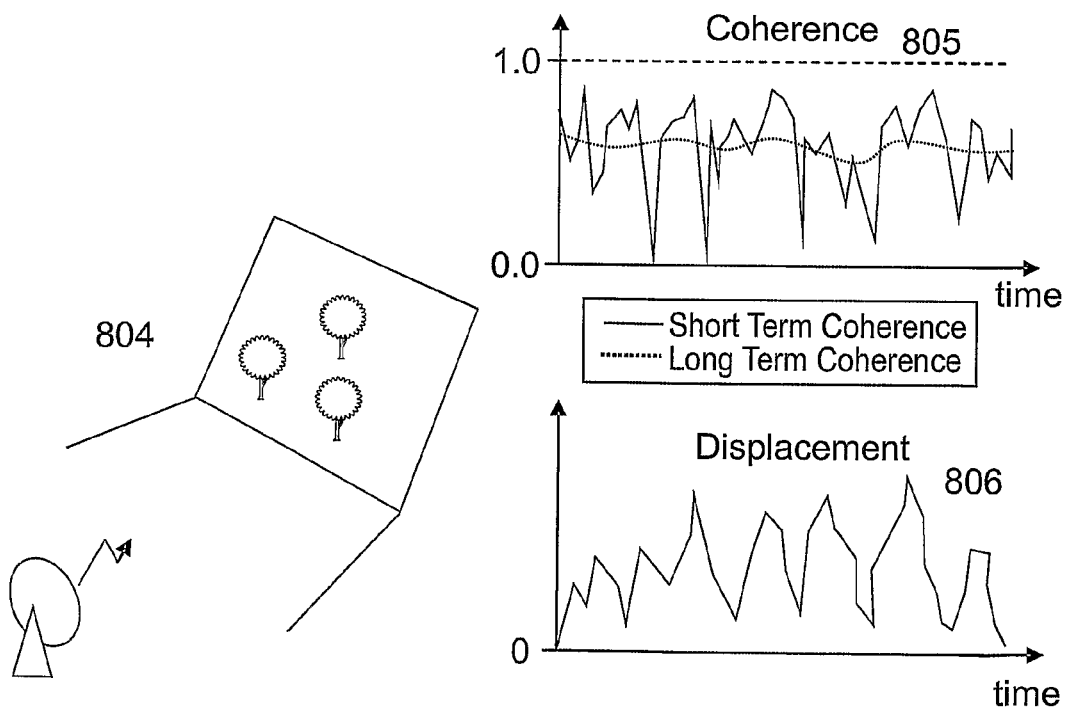

FIG. 7 and FIG. 8 show typical signal response graphs for a number of different conditions. These graphs are an example of the response of the radar for a single point within an area of interest.

FIG. 7a displays the typical response for a slow moving wall 701. For this signal, the signal coherence 702 is reasonably constant, being close to the ideal value of 1.0 and the displacement 703 increases steadily over time. In contrast, FIG. 7b shows a wall 704 that is moving more rapidly and demonstrates acceleration 706. The coherence 705 starts to decay, reducing from close to 1.0 when the rate of movement is small to around 0.5 as the wall speeds up. For a rapidly moving wall any instantaneous estimate of the coherence is quite variable, so to allow decisions to be made more reliably, a second measure is used, the long-term coherence. This is a smoothed version of the estimate produced by equation [2]. In FIG. 7 and FIG. 8, both long term and short-term coherence are graphed.

FIG. 8 shows the typical responses for both trucks and vegetation. Trucks 801 produce spikes in the coherence plot 802, with a clear difference being noted between the short-term and long-term coherence. Often there is also a displacement 803 associated with these events. Vegetation 804 appears like a permanent disturbance 805 to the coherence signal and an erratic displacement signal 806. As with the rapidly moving wall, the long-term coherence is the best determinant of this anomaly.

Figure 9:
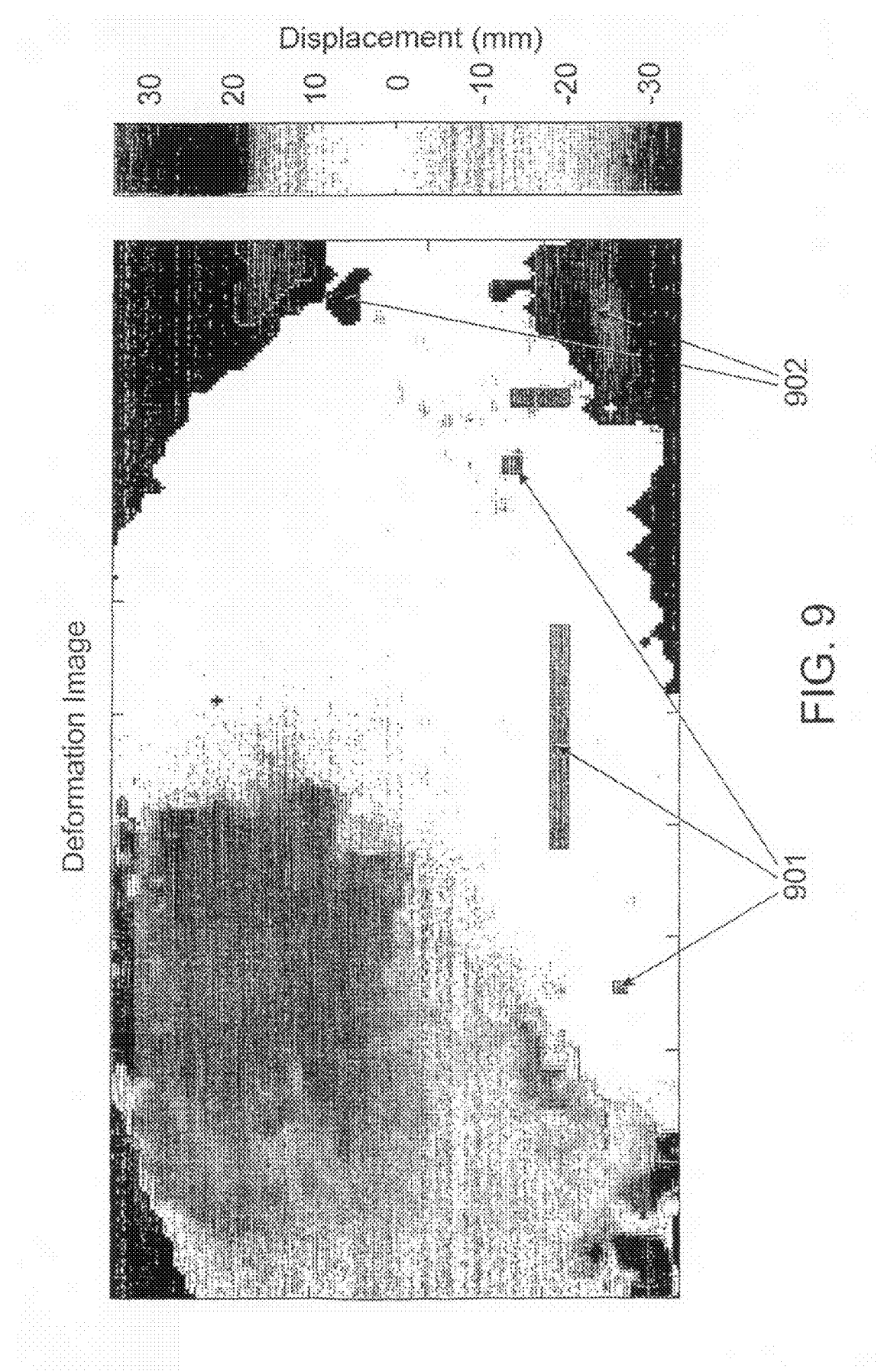
FIG. 9 shows a typical display showing the blocking and disturbance regions in conjunction to the normal displacement measurements.

In FIG. 9, a greyscale display of a typical deformation image is shown. Within the scan region there is normal movement, as well as a number of masks. The sky mask is displayed as black, the disturbance mask 902 is shown as green on a colour display. The blocking mask 901 is shown as grey in a colour display. In the image they are shown as solid colours, but alternatively they could be a shaded version of the normal displacement colour for that area on the wall, thus allowing the point to be both identified and the movement displayed. This is especially important for the disturbance mask 902 as this can be induced by a rapidly moving wall. Other representations could include bordering of the pixel with a given colour. All display methods are focussed on allowing the users to identify the point, thus warning them of measurement issues for those areas on the wall, thus retaining their confidence in the accuracy of the measurements for the remainder of the wall.

The methods of interferometric signal processing correct for anomalies and disturbances in the measured displacement data caused by atmospheric variation, blocking disturbances such as heavy equipment and random disturbances such as vegetation. These corrections enhance the precision of the displacement data leading to more reliable alarms and hence greater user confidence. Throughout the specification the aim has been to describe the preferred embodiments of the invention without limiting the invention to any one embodiment or specific collection of features.

What is claimed is:

1. A method of error handling in interferometric signal processing for a ground based slope monitoring system including the steps of:
   extracting uncorrected movement data from interferometric radar measurements;
   correcting the movement data for changes in atmospheric conditions;
   identifying disturbances in the corrected movement data; and
   displaying the corrected movement data and regions affected by the disturbances,
wherein disturbances are identified in the movement data by detecting variations in short-term and long-term signal coherence.

2. The method of claim 1 wherein displaying regions affected by the disturbances includes masking the regions.

3. The method of claim 1 wherein the step of identifying disturbances includes identifying blocking disturbances caused by short-term blockage of the radar signal.

4. The method of claim 3 wherein the step of identifying disturbances includes identifying disturbances caused by trucks.

5. The method of claim 1 wherein the step of identifying disturbances includes identifying random disturbances caused by long-term interference.

6. The method of claim 5 wherein the step of identifying disturbances includes identifying disturbances caused by vegetation.

7. The method of claim 1 wherein the step of correcting the movement data for changes in atmospheric conditions is achieved by estimating the change in the signal speed due to changes in the refractive index of the air and the offset induced at zero range.

8. The method of claim 1 further including the step of comparing the long-term coherence of a data point to a disturbance mask threshold and classifying the data point as disturbed if the long-term coherence is less than the disturbance mask threshold.

9. The method of claim 1 further including the step of comparing a ratio of short-term coherence to long-term coherence of a data point to a blocking mask threshold and classifying the data point as blocking mask if the ratio is less than the blocking mask threshold.

10. A method of atmospheric correction of movement data comprising multiple data points in a ground based slope monitoring system including the steps of:
    selecting a plurality of atmospheric correction regions at different ranges;
    deducing displacement data within the selected regions;
    determining a search space;
    calculating a cost function for a grid of points within the search space;
    using a minimisation algorithm to determine a correction slope and offset; and
    applying the correction slope and offset to the movement data.

11. The method of claim 10 wherein the step of a using a minimisation algorithm includes calculating local minima within the search space and using the local minima to seed a multidimensional minimisation algorithm to find true minima.

12. A method of identifying disturbances of movement data comprising multiple data points in a ground based slope monitoring system including the steps of:
    determining short-term coherence for each data point;
    averaging the short-term coherence to determine long-term coherence;
    comparing the long-term coherence to a first threshold and masking the data point if the long-term coherence is less than the first threshold; and comparing a ratio of the short-term coherence to the long-term coherence with a second threshold and masking the data point if the ratio is less than the second threshold.

13. The method of claim 12 further including the step of comparing signal amplitude of the data point with a sky threshold and classifying the data point as sky if the amplitude is less than the sky threshold.

14. A ground based slope monitoring system of the type comprising at least a radar module generating interferometric movement measurements of a slope further comprising an anomaly detection and correction module, the anomaly detection and correction module comprising:

an atmospheric correction module comprising a processor that corrects slope movement measurements for anomalies caused by atmospheric changes; and a disturbance detection module comprising a processor that identifies disturbances that cause errors in the slope movement measurements by detecting variations in short-term and long-term signal coherence.

15. The ground based slope monitoring system of claim 14 comprising a video module that provides visual images of the slope.

16. The ground based slope monitoring system of claim 14 comprising a weather sensing module providing atmospheric correction data to the atmospheric correction module.

17. The method of claim 1 wherein the step of correcting the movement data for changes in atmospheric conditions includes acquiring atmospheric correction data from a weather sensing module.

* * * * *